(No Model.)
W. B. FRANTZ.
VESSEL FOR PRESERVING PERISHABLE ARTICLES.
No. 494,099. Patented Mar. 21, 1893.
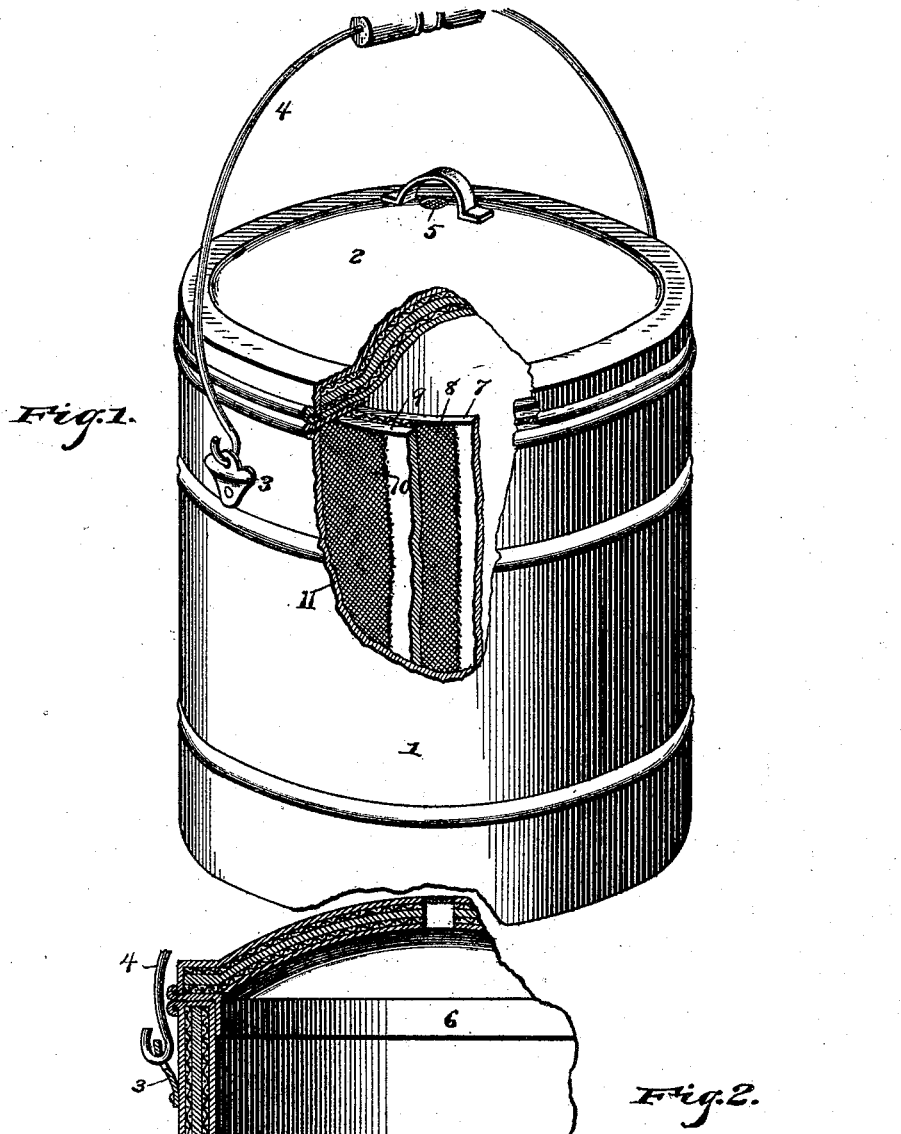
Witnesses
B. S. Olzer
J. H. Piggers
By his Attorneys,
C. A. Snow & Co.
Inventor
Wm. B. Frantz,

United States Patent Office.

WILLIAM B. FRANTZ, OF GUTHRIE, OKLAHOMA TERRITORY, ASSIGNOR OF ONE-HALF TO GEORGE E. MUNDY, OF SAME PLACE.

VESSEL FOR PRESERVING PERISHABLE ARTICLES.

SPECIFICATION forming part of Letters Patent No. 494,099, dated March 21, 1893.

Application filed July 19, 1892. Serial No. 440,706. (No model.)

*To all whom it may concern:*

Be it known that I, WILLIAM B. FRANTZ, a citizen of the United States, residing at Guthrie, in the county of Logan and Territory of Oklahoma, have invented a new and useful Vessel for Preserving Perishable Articles, of which the following is a specification.

My invention relates to improvements in vessels for preserving perishable articles; and the objects in view are to provide a tight vessel composed of non-conducting material, whereby its contents are not affected by the external atmosphere.

With these objects in view, the invention consists in a vessel whose inner and outer walls are formed of metal, the outer wall being preferably formed of aluminum, and between said walls layers of reticulated cloth or wire, asbestos, and reticulated cloth or wire, the same being arranged in the order named and independent of each other, whereby a dead space is formed between the reticulated layers and the internal and external linings of metal of the vessel.

Referring to the drawings:—Figure 1 is a perspective view of a vessel embodying my invention. Fig. 2 is a longitudinal section.

Like numerals of reference indicate like parts in both the figures of the drawings.

1 designates the body of the vessel, and 2 the cover, the body being provided with ears 3 at opposite sides in which are connected the ends of the bail 4. The cover is provided at its center, in this instance, with an opening 5, the same being designed for ventilation and covered by reticulated wire as shown. The cover is further provided with an internal depending flange 6 that fits snugly within the vessel.

In constructing both the cover and vessel the same materials are employed and their arrangements are the same, so that a description of one will suffice for that of the other.

7 designates the internal metal lining which is preferably of tin, though the same may be of other material, and this lining is encircled by a reticulated wire wall 8, which in turn is encompassed by a layer of asbestos or other suitable material, and encircling the asbestos is an outer reticulated wire wall 10, these several layers being inclosed in an external jacket 11, preferably made of aluminum, though if desired it may be of other metal. It will be seen that the reticulated walls are independent of the asbestos, that is, are not embedded therein, and therefore they serve to produce, in connection with the asbestos and the inner and outer metal jackets of the vessel, dead air-spaces.

Aluminum is light and something of a non-conductor, as is also the asbestos, and by reason of the fact that the inner and outer jackets and the asbestos are spaced apart, heat or cold cannot be transferred from one to the other by induction.

A vessel thus constructed will be found to be convenient and effective for carrying butter or other perishable articles, wherein an even temperature is desirable.

It will be obvious that this non-conducting wall, although herein shown as being employed in sheet-metal vessels, may be employed in the construction of refrigerators, chests, &c., and hence I do not limit the invention to the precise use shown.

Having described my invention, what I claim is—

1. A vessel composed of an inner metal lining, a reticulated wall surrounding the same, an asbestos wall surrounding the reticulated wall, a second reticulated wall surrounding the asbestos, and an external lining of metal, substantially as specified.

2. A non-conducting wall, consisting of an inner metal imperforate lining and a similar outer jacket, inner reticulated walls adjacent to the inner surfaces of said lining and jacket, and a layer of asbestos located between the two reticulated walls and independent thereof, substantially as specified.

In testimony that I claim the foregoing as my own I have hereto affixed my signature in the presence of two witnesses.

WILLIAM B. FRANTZ.

Witnesses:
FRANK L. DE LAY,
A. F. HOLCOMB.